US008402116B2

(12) United States Patent
Ma et al.

(10) Patent No.: US 8,402,116 B2
(45) Date of Patent: Mar. 19, 2013

(54) SYSTEM FOR VENDING GAME CONTENTS AND METHOD THEREOF (75) Inventors: Jinsuk Ma, Daejeon (KR); Jaeho Lee, Daejeon (KR); Sunja Kim, Daejeon (KR); Chaekyu Kim, Daejeon (KR); Hosang Ham, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 525 days.

(21) Appl. No.: 12/765,700

(22) Filed: Apr. 22, 2010

(65) Prior Publication Data

US 2010/0312382 A1 Dec. 9, 2010

(30) Foreign Application Priority Data

Jun. 9, 2009 (KR) ........................ 10-2009-0051165

(51) Int. Cl.
*G06F 15/16* (2006.01)
(52) U.S. Cl. ........................ 709/219; 709/217; 709/226
(58) Field of Classification Search .................. 709/217, 709/219, 226
See application file for complete search history.

(56) References Cited

U.S. PATENT DOCUMENTS

| 2003/0001888 | A1* | 1/2003 | Power .......................... 345/744 |
| 2003/0057219 | A1 | 3/2003 | Risolia |
| 2003/0163382 | A1 | 8/2003 | Stefanik et al. |
| 2005/0261062 | A1* | 11/2005 | Lewin et al. ..................... 463/42 |
| 2006/0143675 | A1* | 6/2006 | Willis et al. .................... 725/114 |
| 2006/0205510 | A1* | 9/2006 | Lauper et al. ................... 463/41 |
| 2009/0132915 | A1* | 5/2009 | McCraw et al. ............... 715/700 |
| 2009/0143128 | A1* | 6/2009 | Cautley et al. ................... 463/17 |
| 2009/0249489 | A1* | 10/2009 | Livshits et al. ................. 726/26 |
| 2009/0292791 | A1* | 11/2009 | Livshits et al. ............... 709/217 |
| 2009/0300144 | A1* | 12/2009 | Marr et al. ..................... 709/219 |
| 2010/0185677 | A1* | 7/2010 | Gupta et al. ................... 707/784 |
| 2011/0151971 | A1* | 6/2011 | Altshuler et al. ............... 463/30 |

FOREIGN PATENT DOCUMENTS

| JP | 2008539490 A | 11/2008 |
| KR | 1020060068457 A | 6/2006 |
| KR | 1020060080286 A | 7/2006 |
| KR | 1020070021751 A | 2/2007 |
| WO | WO 01/20844 A1 | 3/2001 |
| WO | WO 02/09044 A2 | 1/2002 |
| WO | WO 2006/117632 A1 | 11/2006 |

OTHER PUBLICATIONS

Extended Search Report of the European Patent Office for Application No. 10160765, dated Oct. 14, 2010.

* cited by examiner

*Primary Examiner* — Firmin Backer
*Assistant Examiner* — Jonathan Bui (57) ABSTRACT The present invention relates to a game vending machine that receive game contents from a service provider server and vends the game contents, the game vending machine comprising: a data analyzer that divides the game contents transmitted from the service provider server into a game executing file and UI generating information and divides the UI generating information into variable dynamic information and continuously usable static information and outputs the divided information; a dynamic information updating unit that receives the dynamic information and updates the previously stored dynamic information; an interface generator that receives the static information and the updated dynamic information to generate a user interface to be used for vending games; and an interface managing unit that displays the generated user interface to a user.

15 Claims, 7 Drawing Sheets

| ITEM | CONTENTS | REPRESENTATIVE EXAMPLE |
|---|---|---|
| GAME NAME | NAME OF GAME | HEROES OF THREE KINGDOMS 2 |
| DEVELOPER | NAME OF GAME DEVELOPER | GAMENET |
| GENRE | GENRE OF GAME | ACTION RPG |
| SYNOPSIS | SYNOPSIS AND DESCRIPTION OF GAME CONTENTS | YUBI, SONKWON, AND JOJO FIGHT TO BECOME RULER OF THE WHOLE COUNTRY ···. |
| NETWORK USE | KIND OF WIRED AND WIRELESS NETWORK SUPPORTING GAME | BLUETOOTH |
| USER EVALUATION | GENERAL EVALUATION ON GAME BY USERS | 8/10 |
| USER EVALUATION | USER EVALUATION ON GAME COMPLETENESS | 9/10 |
| PRICE | VENDING PRICE OF GAME | 3$ |
| SUPPORT MOBILE COMMUNICATION CARRIER | MOBILE COMMUNICATION CARRIER SUPPORTING GAME | SKT,KTF,LGT |
| SUPPORT TERMINAL | KIND OF MOBILE TERMINALS SUPPORTING GAME | SCH2000,SPH3000 |
| GAME CAPACITY | SIZE OF GAME | 1,329Kbytes |
| GAME RANK | POPULARITY RANK OF CURRENT GAME AMONG ALL OF THE VENDED GAMES | 30 |
| NOTICES | MATTERS THAT VENDOR WISH TO NOTIFY TO THE CONSUMER | PRIZE GIVEAWAY EVENT IS CURRENTLY BEING PROGRESSED |
| REPRESENTATIVE SCREEN SHOT | REPRESENTATIVE SCREEN SHOT OF GAME | HEROES OF THREE KINGDOMS 2.jpg |
| SCREEN SHOT | VRAIOUS KINDS OF SCREEN SHOTS OF GAME | HEROES OF THREE KINGDOMS 2_1.jpg HEROES OF THREE KINGDOMS 2_2.jpg HEROES OF THREE KINGDOMS 2_3.jpg |
| EVALUATION /REVIEW | EVALUATION OF USERS | ID: G_mania INTERSTING. STRONG RECOMMENDATION |
| COMPRESSION FILE NAME | COMPRESSED FILE NAME OF ALL FILES | THREE KINGDONMS 2.zip |
| COMPRESSION FILE CAPACITY | CAPACITY OF COMPRESSED FILE OF ALL FILES | 1.2Mbytes |
| GAME VERSION | VERSION NUMBER OF GAME | VER 1.2.3 |

FIG. 6

| ITEM | CONTENTS | REPRESENTATIVE EXAMPLES |
|---|---|---|
| ADVERTISEMENT NAME | NAME OF ADVERTISEMENT | AUDI A3 MOVING PICTURE |
| ADVERTISEMENT COMPANY | ADVERTISER OR ADVERTISEMENT COMPANY | HANYANG PLANNING |
| KIND OF ADVERTISEMENT | GENRE OF ADVERTISEMENT | VEHICLE ADVERTISEMENT |
| REPEATED FREQUENCY | REPEATED FREQUENCY OF ADVERTISEMENT BROADCASTING | 1000 TIMES |
| ADVERTISEMENT PERIOD | BROADCASTING PERIOD OF ADVERTISEMENT BROADCASTING | 2009.2.1-2009.2.3 |
| FILE NAME | COMPRESSION FILE NAME OF ADVERTISEMENT MOVING PICTURE | Audi.zip |
| FILE CAPACITY | COMPRESSION FILE CAPACITY OF ADVERTISEMENT MOVING PICTURE | 23Mbytes |
| FILE FORMAT | COMPRESSION FILE FORMAT OF ADVERTISEMENT MOVING PICTURE | Avi,mov,wmv |

FIG. 8

SYSTEM FOR VENDING GAME CONTENTS AND METHOD THEREOF

RELATED APPLICATIONS

The present application claims priority to Korean Patent Application Serial Number 10-2009-0051165, filed on Jun. 9, 2009, the entirety of which is hereby incorporated by reference.

BACKGROUND OF THE INVENTION

1. Field of the Invention

The present invention relates to a system for vending game contents and a method thereof. More specifically, the present invention relates to a system for vending game contents including a game vending machine, which commercializes and vends game contents, to vend the game contents to a user that searches the game contents stored in the game vending machine and makes a predetermined payment for the game contents and a method thereof.

2. Description of the Related Art

Currently, a mobile phone, as a personal communication device, has various functions in various types of models. The mobile phone already includes a high pixel camera phone, a digital multimedia broadcasting (DMB) receiving function, etc. In particular, the mobile phone already has a file viewer or a text viewer that is included in an existing smart phone, etc. Further, the mobile phone having functions such as a moving picture player, an MP3 player, etc., are also widely used as a representative mobile terminal. In recent, a portable multimedia player (PMP) includes a wireless communication device such as an HSDPA modem or a wireless LAN device in addition to a moving picture and music reproducing function, a text viewer function, a navigation function, etc., and an Internet browser in conjunction with a predetermined software program, such that it has wireless accessing function via Internet. Recently, i-Pod touch available from Apple Co., etc., includes various moving pictures and music reproducing functions, a slide show function, etc., and access Internet by its own wireless LAN function to provide a function that can purchase digital contents online.

As described above, a highly functional personal terminal in various types of models have been launched on the market. A mobile phone, as a representative personal terminal, has various additional apparatuses and services similar to having a PC in the palm of the users' hands. Almost all mobile phones include a high definition camera, a terrestrial or satellite DMB function in addition to a voice communication function and includes functions, that are too numerous to mention, such as a GPS navigation function, a mobile office function, a game function, etc., in some cases. In addition, a portable multimedia player (PMP) having a specialized function separately from a mobile phone and a car navigation terminal have been developed at a significantly rapid speed. In a technical aspect, the PMP and GPS navigation terminals have a similar configuration of electronics part with an operating system using the electronics part, a middleware, etc., that are similarly configured. As a result, it may be said that the PMP and GPS navigation terminals are substantially the same. However, when they are finally vended to the users, other markets may be formed depending on where marketing is focused.

Meanwhile, the various personal terminals described above have been subjected to various technical evolving processes and rapidly expanded to the public. According to this tendency, apparatuses for providing digital contents to provide or vend multimedia contents, such as various movies, dramas, music videos, e-books, etc., which are being currently vended online, to a portable terminal offline have been actively developed.

The apparatus for providing digital contents described above is installed inside or outside a room where users are crowded and receives the corresponding digital contents from a central server using a wired data network according to a request of a user and transmits them to a Portable terminal. As a result, the apparatus for providing digital contents is an apparatus that charges for the contents.

The apparatus for providing digital contents provides contents data to the portable terminal of the user without separately paying for the use of wireless Internet (paying for the use of a packet), such that the user can conveniently receive the digital contents at lower cost and at the desired places as compared to a scheme for the users to receive the digital contents through mobile communication networks of existing mobile communication carriers.

Meanwhile, when the user is using the mobile phone, he/she purchases game contents that can be executed through the mobile phone using the following methods.

First, the user can purchase game contents using wireless Internet services that are provided from mobile communication carriers. In this case, the user separately bears the expenses of the game contents as well as the packet fee that should be paid for downloading the game contents. However, since the packet fee that should be paid for downloading the game contents is generally higher than the purchasing expense of the game contents, the user should pay a great deal of expenses to purchase one game contents. Further, the game providers that produce or hold the game contents consign the game contents to the mobile communication carriers to vend the games. At this time, since a plurality of game providers consign their own games to a very small minority of mobile communication carriers to vend the games, the game vending market for the mobile terminal is being operated in a very closed form.

As another method, there is a method of allowing the user to access the sites, that are operated by the game providers, using his/her own personal PC so that the user directly downloads the game contents to his/her own mobile phone. In the case of the method, the PC should be installed with the corresponding device driver so that the personal PC can recognize the user's mobile phone, and requires a data cable for a mobile phone for transmitting data. In addition, since the method should be subjected to complicated authentication and purchasing processes such as a member joining process, a log-in process, a payment process, it is very inconvenient to perform the above-mentioned processes using another person's PC, especially when not using his/her own PC.

As another method, there is a method of accessing other portable terminals, which have the same function and are compatible with each other, in wire or wireless to download and use game contents. However, since the contents are transmitted in different transmission form according to the terminal manufacturers, it is difficult to download the corresponding digital contents when the terminal is not manufactured by the same manufacturer.

Most users should purchase the contents using the wireless Internet services, which are provided by the mobile communication carriers, even though they pay for the usage right of expensive packets to the mobile communication carriers.

Meanwhile, in the currently marketed PMP terminal, various models include a touch screen display. These terminals provide various games to the users using a finger touch or a touch pen. In the case of the games used in the PMP terminal, the user accesses a service site that is operated by a company vending the corresponding products, downloads and installs his/her desired game to a memory card used in the PMP terminal, and inserts the memory card in the PMP terminal, thereby accessing the game. Even in the case, however, since the user should have a PC that can access the Internet, a memory card reader, and a memory card, it is known that the users physically on the move do not generally use the method.

Therefore, even in the case of the game providers that provide mobile game contents, because they can not secure efficient vending channels, the related industry is not active. As a result, small-scale contents developers or providers are likely to remain small businesses.

SUMMARY OF THE INVENTION

The present invention proposes to solve the above problems.

It is an object of the present invention to provide a system for vending game contents capable of freely vending the game contents held or produced by game providers without using an infrastructure such as a base station of a mobile communication carrier and a method thereof.

It is another object of the present invention to maximize the advertisement and vending of game contents vended through game vending machine by frequently changing variable dynamic information such as statistical data on the vending of games, rank in popularity of games, change information on vending price of games, an event advertisement description for the game contents, etc., according to vending situations or vending environments, etc.

It is yet another object of the present invention to provide the desired game contents to a user without performing complicated purchasing procedures at low cost.

A game vending machine of the present invention relates to a game vending machine that receives game contents from a service provider server and vends the game contents, the game vending machine including: a data analyzer that divides the game contents transmitted from the service provider server into a game executing file and UI generating information and divides the UI generating information into variable dynamic information and continuously usable static information and outputs the divided information; a dynamic information updating unit that receives the dynamic information and updates the previously stored dynamic information; an interface generator that receives the static information and the updated dynamic information to generate a user interface to be used for vending games; and an interface managing unit that displays the generated user interface to a user.

The dynamic information includes at least one information of statistical data on the vended games, a rank in popularity of games, change information on a vending price of games, an event advertisement description for vending games, and user evaluation of games.

The static information includes at least one of a representative screen shot of games, a name of games, a synopsis of games, a genre of games, and a mobile communication carrier for supporting games.

The game vending machine further includes a library dependency inspector that manages a plurality of library files necessary to execute the game executing file in a user terminal and process the game executing file and the corresponding library file to be transmitted to the user terminal according to the request of the user.

The game vending machine further includes a server communication managing unit that transmits advertisement contents received from the service provider server to the data analyzer, wherein the interface managing unit receives the advertisement contents from the data analyzer and displays the advertisement to the user according to the advertisement method described in a descriptor of the advertisement contents.

The game vending machine further includes a data output unit that uses any one communication interface of serial communication, a universal serial bus (USB), a wireless USB, UWB, IEEE1395, WLAN, WIMAX, WIBRO, and a Bluetooth interface to transmit the game executing file to the user terminal.

The game vending machine further includes a contents managing unit that receives the game executing file and updates a contents DB, wherein the contents managing unit uses the UI generating information to determine a kind of supportable terminals and divides the game executing file for each supportable terminal to update the contents DB.

The game vending machine further includes: a terminal information grasping unit that grasps the information on a kind of the user terminals to transmit the game executing file; and a content image selector that extracts the game executing file corresponding to the kind of the user terminal grasped through the terminal information detector from the contents DB.

The game vending machine further includes a state managing unit that manages state information on the game vending machine and periodically transmits the state information to the service provider server, wherein the state information includes at least one information of a vending state of games, statistical data of vended games, a vending price of games, an operating situation of the game vending machine, an elapsed time after the final vending, and a vending situation of games at each time.

A method for vending games of the present invention relates to a method that receive game contents from a service provider server and vends the received game contents, the method for vending games including: analyzing data transmitted from the service provider server and detecting a kind of transmitted data; dividing the game contents into a game executing file and UI generating information when the transmitted data is game contents; dividing the UI generating information into variable dynamic information and continuously usable static information; receiving the dynamic information and updating previously stored dynamic information; and receiving the static information and the updated dynamic information to generate an user interface for vending the game contents.

The dynamic information includes at least one information of statistical data on the vending of games, a popularity rank of games, change information on a vending price of games, an event advertisement description for vending games, and user evaluation of games.

The static information includes at least one information of a representative screen shot of games, the name of games, a synopsis of games, the genre of games, and a mobile communication carrier for supporting games.

The method for vending games further includes transmitting the game executing file and library files necessary to execute the game executing file in a user terminal to the user terminal according to the request of the user.

The method for vending games further includes periodically transmitting the state information including at least one information of a vending state of games, statistical data of vended game, a vending price of games, an operating situation of the game vending machine, an elapsed time after the final vending, and a vending situation of games at each time to the service provider server.

The method for vending games further includes determining a kind of supportable terminals by the game executing file using the UI generating information to divide the game executing file for each supportable terminal and update the contents DB.

The following effects can be obtained by the present invention.

In the viewpoint of the game provider, the game vending machine posts the game contents held or produced by the game provider to incur the users' interest, such that the game provider can maximize a profit on sale and easily receive essential functions, such as registration, search, store, delete, sale, statistics, etc., of the game contents.

In particular, the game provider frequently changes variable dynamic information such as statistical data on the vending of games, popularity rank of games, change information of a vending price of games, an event advertisement description of games, etc., according to vending situations or vending environments, etc., thereby making it possible to maximize the advertisement and sale of game contents vended through a game vending machine.

In addition, in the view point of the user purchasing the game contents, the user can simply and conveniently purchase the game contents at much lower price than the case of purchasing the game contents using a personal computer or a mobile communication network. The reason is that this the complicated processes such as the Internet search of the game vending sites, the user registration, the user log in, the payment information input, etc., are avoided and can substantially save on cost, for example, monthly fees from wireless Internet, etc., by not using the wireless Internet services provided by the mobile communication carriers.

DETAILED DESCRIPTION OF THE PREFERRED EMBODIMENTS

The present invention will be described below with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of elements in the drawings may be exaggerated for explicit comprehension.

Hereinafter, exemplary embodiments of the present invention will be described in detail with reference to the accompanying drawings.

Although the present invention describes a mobile terminal without specific descriptions thereof, it is based on all the portable terminals such as a mobile phone, a PMP, a GPS navigation terminal, a portable game machine, etc.

Figure 1:
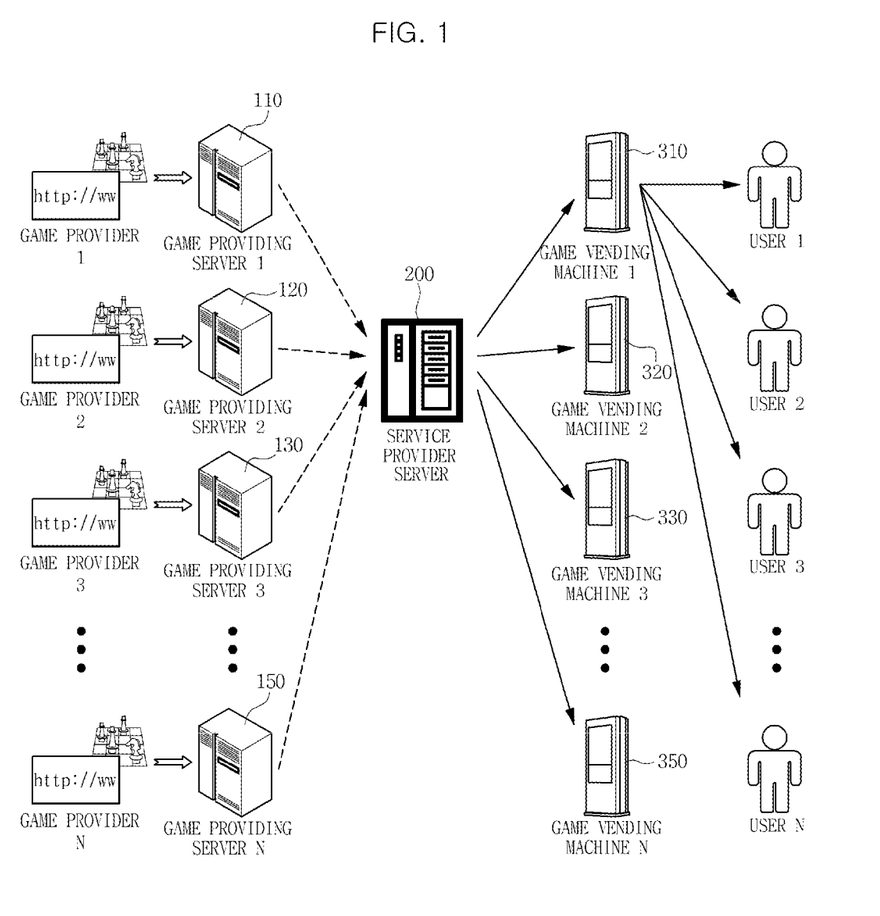
FIG. 1 is a diagram for explaining a system for vending game contents according to one embodiment of the present invention.

FIG. 1 is a diagram for explaining a system for vending game contents according to one embodiment of the present invention.

Referring to FIG. 1, a system for vending game contents according to the present invention includes a plurality of game providing servers 110, 120, 130, and 150, a service provider server 200, and a plurality of game vending machines 310, 320, 330, and 350. In the present invention, the game providing servers 110, 120, 130, and 150, and the game vending machines 310, 320, 330, and 350 have the same technical configuration and perform the same functions and therefore, one game server providing server 110 and one game vending machine 310 will be described as an example in the following description.

First, each game provider shown in FIG. 1 stores game contents held or produced by the game providers and the corresponding game contents information in the game providing server 100 and manages them, according to a predetermined format. The game provider means a game producer or a game vendor that vends or distributes the game contents held by the game provider.

The game providing server 110 stores and manages the game contents produced by the game provider and advertisement contents produced by an advertisement provider. The game providing server 110 periodically transmits the game contents and the advertisement contents, which are stored therein, to the service provider server 200.

The service provider server 200 receives the game contents from the game providing server 110 and processes the received game contents to be vended or distributed to a user through the game vending machine 310. At this time, the service provider server 200 provides the game contents to the game vending machine 310, which is reasonably authenticated and registered through a predetermined authentication and registration process, among the game vending machines.

Meanwhile, as a network infrastructure (that is, a network infrastructure among the game providing server, the service provider server, and the game vending machine) for building the system for vending game contents, it is preferable to use an existing internet service provider (ISP). However, most ISPs provides a dynamic internet protocol (IP) address. In the dynamic IP environment, in order to implement the system for vending game contents of the present invention, the game vending machine 310 should periodically access the service provider server 200 to confirm its own IP registration. If the IP of the game vending machine is changed, the game vending machine should confirm the change and correct its own IP. Through the process, it is possible to normally build the system for vending game contents and the game vending machine 310.

The service provider server 200 according to the present invention performs a function of authenticating the game vending machine 310 registered therein, managing the IP address of the corresponding game vending machine 310, and monitoring the operating state of the corresponding game vending machine 310.

The game vending machine 310 receives the game contents from the corresponding service provider server 200 and vends or distributes the game contents to the user. That is, after a predetermined payment process is performed, the game vending machine 310 transmits the stored game contents to the mobile terminal of the user. In addition, the game vending machine 310 performs a function that periodically accesses the service provider server 200 and confirms its own IP registration.

Meanwhile, although FIG. 1 shows and describes the game providing server 110 and the service provider server 200 as a separate configuration, the service provider server 200 may be implemented so as to integrate with the game providing server 100 upon implementing the system. This is a problem in operation or implementation and therefore, it is apparent that it is not a problem of the reduction or deformation of logical functions.

Further, the service provider server 200 may selectively receive the game contents that are stored in the plurality of game providing servers 110 to 150.

Figure 2:
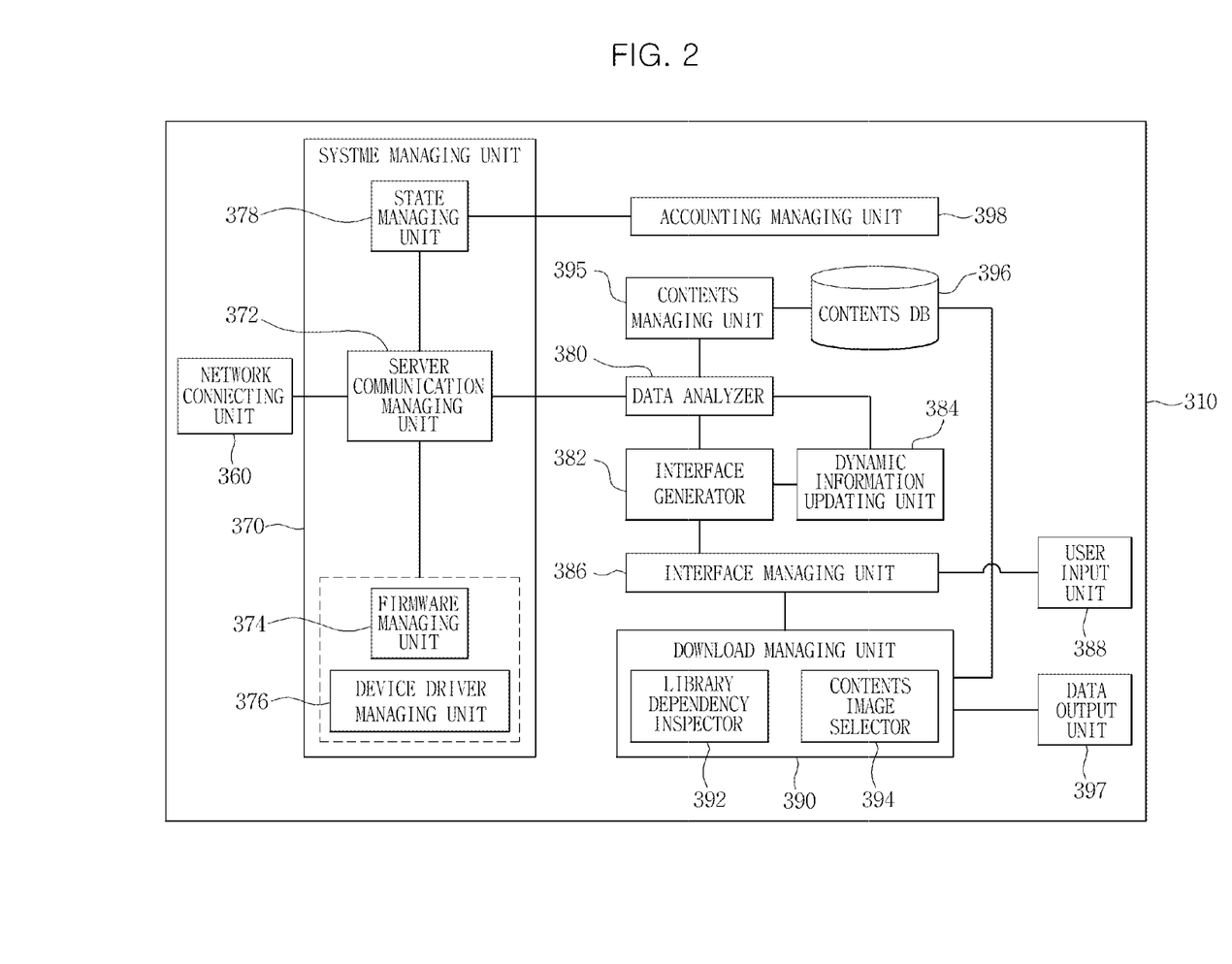
FIG. 2 is a block diagram for explaining in more detail a configuration of a game vending machine shown in FIG. 1.

FIG. 2 is a block diagram for explaining in more detail a configuration of the game vending machine 310 shown in FIG. 1.

Referring to FIG. 2, the game vending machine (GVM) 310 according to the present invention includes a network connecting unit 360, a system managing unit 370, a data analyzer 380, an interface generator 382, a dynamic information updating unit 384, an interface managing unit 386, a user input unit 388, a download managing unit 390, a contents managing unit 395, a contents DB 396, a data output unit 397, and an accounting managing unit 398.

The network connecting unit 360 functions so that the contents vending machine 310 accesses the service provider server 200 to perform communication. In other words, the network connecting unit 360 is connected to the server communication managing unit 372 in the system managing unit 370 to transmit data to the service provider server 200 or receive data transmitted from the service provider server 200. In addition, although not shown in FIG. 2, the network connecting unit 360 may access an external payment server (not shown) that makes a payment for vending the game contents to perform communication. The payment server is a server that charges for game contents purchased by the user and charges for the contents using the existing used various methods, such as cash, card, E-money, mobile phone payment, etc.

The system managing unit 370 processes a data input and output through the network connecting unit 360 and manages a firmware of the game vending machine 310.

To this end, the system managing unit 370 includes a server communication managing unit 372, a firmware managing unit 374, a device driver managing unit 376, and a state managing unit 378.

When the server communication managing unit 372 receives data from the service provider server 200 through the network connecting unit 360, it analyzes a header of the received data to determine the kind of corresponding data and transmits it to the firmware managing unit 374, the device driver managing unit 376, or the data analyzer 380. More specifically, the server communication managing unit 372 analyzes the header of the received data from the service provider server 200 and then, when the received data is the game contents or the advertisement contents, transmits it to the data analyzer 380 and when the received data is the firmware, transmits it the firmware managing unit in the system managing unit 370. When the received data is a device driver, the server communication managing unit 372 is it to the device driver managing unit 376.

The firmware managing unit 374 receives firmware from the server communication managing unit 372 to newly install it in the game vending machine 310 or update the firmware that is already installed. For example, the firmware managing unit 374 receives a security software patch and new software upgrade files of various modules that are requested by an operational system installed in the game vending machine 310 and software requested by the game provider or the service provider to newly install them in the game vending machine 310 and update them.

The device driver managing unit 376 manages the device drivers corresponding to different portable terminals in order to support the various mobile terminals of the users in the game vending machine 310. When the user accesses his/her own portable terminal the game vending machine 310 in wired or wireless in order to purchase the game contents from the game vending machine 310, the device managing unit determines the kind of accessed portable terminal in order to recognize the portable terminal of the user in the game vending machine 310 by using the corresponding device driver.

Meanwhile, when the device driver corresponding to the portable terminal accessed to the game vending machine 310 does not exist in the device driver list managed in the device driver managing unit 376, the device driver managing unit 376 notifies to the user that the portable terminal of the corresponding kind cannot be used and at the same time, reports it to the service provider server 200 through the system managing unit 370. Therefore, the service provider server 200 reports it to a central server (not shown) and receives the device driver corresponding to the portable terminal in question from the central server.

The state managing unit 378 performs a role of managing the state information of the game vending machine 310 and periodically transmitting it to the service provider server 200 through the network connecting unit 360. The state information managed in the state managing unit 378 may be a vending state of game contents, statistical data of vended game contents, a vending price of game contents, a current operating situation of the game vending machines 310, an elapsed time after final vending, and a vending situation of game contents each time, etc.

The data analyzer 380 receives the game contents and the advertisement contents through the server communication managing unit 372. At this time, the game contents received through the server communication managing unit 372 include a game executing file (compression image) for executing games as well as the information (UI generating information) for generating the user interface for vending games. The user interface is an interface that is provided to the user in order to acquire the detailed or outline information on the contents to be purchased when the user purchases the contents. In order to vend the games, the information (UI generating information) for generating the user interface may include game image information (for example, game representing screen shot), statistical data on vending games, rank in the popularity of games, change information on a vending price of games, an event advertisement description for game contents, etc.

The data analyzer 380 receives the game contents to transmit the variable dynamic information, such as the statistical data on vending games, the rank in popularity of games, the change information of the vending price of games, the event advertisement description for game contents, etc., to the dynamic information updating unit 384 and to transmit static information, which is continuously used at the time of vending if generated once like the game image information, to the interface generator 382. The variable dynamic information such as the statistical data on the vending of games, the rank in popularity of games, the change information of the vending price of games, the event advertisement description for game contents should be frequently updated according to the vending situations or the vending environments, etc. Therefore, in the present invention, the foregoing dynamic information can be frequently updated through the dynamic information updating unit 384 and changed and the user interface finally generated through the interface generator 382 can be changed according to the vending situations or the vending environments, etc. According to the present invention, the advertisement and vending effect of the game contents, which are vended through the game vending machine, can be maximized. The data analyzer 380 transmits the game executing file (compression image) necessary to execute games in the received game contents to the contents managing unit 395.

The contents managing unit 395 uses the search function to determine whether the game executing file transmitted from the data analyzer 380 is the game contents that are previously stored in the contents DB 396. As the determination result, when the game executing file is the game contents (that is, game contents to be newly installed) that are not previously stored, the contents managing unit 395 determines a kind of supportable terminals by using an XML descriptor of the received game contents and divides game executing file for each supportable terminal, decompress the game executing file, and update the contents DB 396.

The contents DB 396 separates and stores the decompressed game executing file that support each portable terminal and transmits the corresponding game execution file to the download managing unit 390 according to the request from the download managing unit 390.

Meanwhile, when the contents received through the server communication managing unit 372 are the advertisement contents, the data analyzer 380 transmits the advertisement contents to the interface managing unit 386. The interface managing unit 386 can display the advertisement to the user according to the advertisement method of the advertisement contents described in the XML descriptor of the advertisement contents.

The interface generator 382 receives the static information from the data analyzer 380 and the dynamic information updated through the dynamic information updating unit 384 to generate the user interface for vending the corresponding game contents. The interface generator 382 outputs the generated user interface to the interface managing unit 386.

The interface managing unit 386 manages the plurality of user interfaces corresponding to the plurality of game contents and displays the user interface of the game contents generated through the interface generator 382 to the user. In addition, as described above, the interface managing unit 386 displays the advertisement to the user according to the advertisement method of the advertisement contents described in the XML descriptor of the advertisement contents.

The user input unit 388 can be implemented as a unit that can perform both input and output like a touch screen and can also be implemented through user input units using wireless communication such as Bluetooth, keyboard, mouse, etc.

An accounting managing unit 398 charges for the game contents purchased by the user. The accounting managing unit 398 can charge for vending game contents through various accounting methods such as cash, credit card, prepaid card, transportation card, etc.

The accounting managing unit 398 can transmit the results for the vending of game contents to the state managing unit 378 to analyze and arrange the vending state of game contents, the statistical data of the vended game contents, a vending price of game contents, the elapsed time after the final vending, the vending situation of game contents at each time, etc.

When the download managing unit 390 completes the charge for the purchase of the game contents using the accounting managing unit 398, it extracts the corresponding game contents, which are stored in the contents DB 396, according to the input of the user and transmits the extracted game contents to the user terminal.

To this end, the download managing unit 390 includes a library dependency inspector 392 that manages the library file necessary to execute the game contents and a contents image selector 394 that selectively extracts the game executing files of the corresponding game contents from the contents DB 396 according to the selection of the user.

For example, in the case where there is a need for an additional vector graphic library, window library, etc., in order to execute the game contents selected by the user, a need exists for the game contents as well as a library file necessary to execute the game contents when the corresponding game contents are transmitted from the game vending machine 310 to the portable terminal (hereinafter, user terminal) of the user. Thereby, the library dependency inspector 392 determines whether the user terminal needs an additional library file. If it is determined that when the corresponding user terminal needs an additional library file, the user terminal selectively extracts the additional library file and transmits it when the game contents are transmitted to the user terminal.

The contents image selector 394 extracts the game executing file corresponding to the kind of user terminal from the contents DB 396 and transmits the corresponding game executing file to the user terminal.

When the library file and the executing file of the game contents, which are transmitted to the user terminal from the library dependency inspector 392 and the contents image selector 394 are prepared, the download managing unit 390 transmits the prepared game executing file and library file to the user terminal through the data output unit 397.

Meanwhile, although not shown in the drawings, the download managing unit 390 basically includes a terminal information determining unit (not shown) in order to achieve the foregoing. The terminal information determining unit requests the information on the specifications of the user terminal, which transmit the game contents, to determine the information of the terminal. At this time, assuming that the specifications of the user terminal are previously input in the user terminal, a specification information transmitting button built in the user terminal is pressed, thereby making it possible to exchange a message including the information on the game vending machine 310 according to the present invention and the user terminal.

Meanwhile, the user terminal is connected to units by a cable, for example, provided in the game vending machine according to the present invention and the terminal information determining unit can be connected to the user terminal through the cable to acquire the information on the user terminal. The user desired game contents may be transmitted from the game vending machine 310 to the user terminal through the connecting cable.

As another method, the terminal information determining unit enables the user to directly input the specifications of its own terminal through the user input unit 388.

The terminal information obtained through the foregoing includes an image compression format that is supported by the user terminal, the size of a spare storage space, the screen information of the user terminal, the kind of documents that are supported by the user terminal, the moving picture compression format that is supported by the user terminal, the main memory size of the user terminal, the CPU information of the user terminal, the platform and the library version information mounted on the user terminal, and the kind of libraries that are mounted on the user terminal.

The data output unit 397 accesses the user terminal by using a wired and wireless interface such as serial communication, a universal serial bus (USB), a wireless USB, UWB, IEEE1395, WIGAN, WIMAX, WIBRO, a Bluetooth interface, etc., to transmit the contents requested by the user to the user terminal and the game vending machine 310 can perform communication with the user terminal. It can be easily expected that the data output unit may have various kinds of wired and wireless interface standards that may be domestic and foreign with the development of technology in the future. Further, it is apparent that the user terminal may include a mobile phone, a PMP, a notebook, a net book, a game machine, an electronic notebook, a PDA, a storage device having a flash memory, a memory card, an optical storage device such as a CD/DVD/Blu-ray disk, etc., other modified storage devices.

Figure 3:
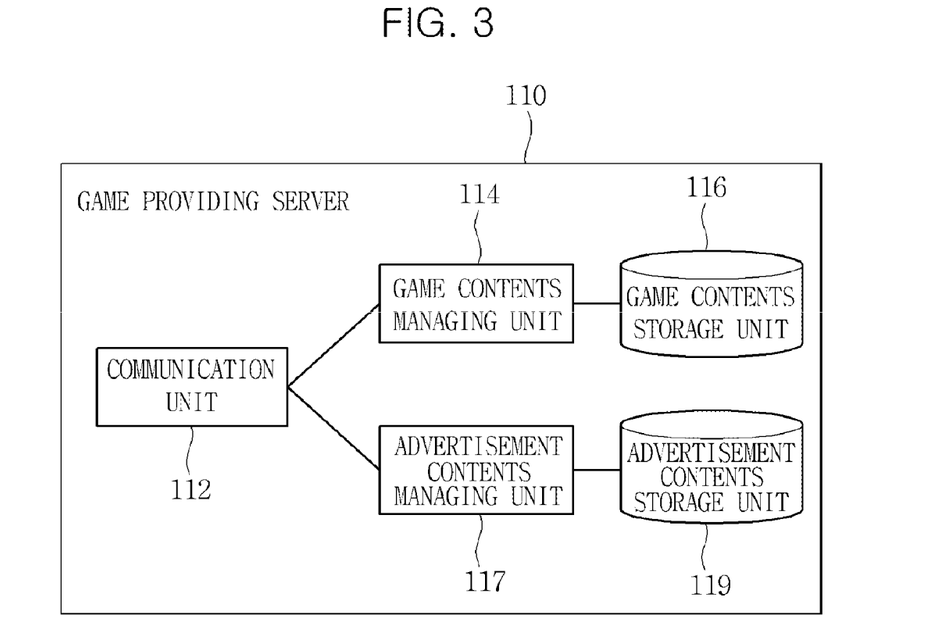
FIG. 3 is a block diagram for explaining in more detail a configuration of a game providing server in the system for vending game contents in shown in FIG. 1.

FIG. 3 is a block diagram for explaining in more detail a configuration of the game providing server 110 in the system for vending game contents shown in FIG. 1.

Referring to FIG. 3, the game providing server 110 according to the present invention includes a communication unit 112, a game contents managing unit 114, a game contents storage unit 116, an advertisement contents managing unit 117, and an advertisement contents storage unit 119.

The communication unit 112 functions so that the game providing server 110 can access the server provider server 200 to perform communication. In other words, the communication unit 112 receives the advertisement contents and the game contents from the game contents managing unit 114 and the advertisement contents managing unit 117 and transmits them to the service provider server 200 and transmits the data transmitted from the service provider server 200 to the game contents managing unit 114 or the advertisement contents managing unit 117.

Figure 5:
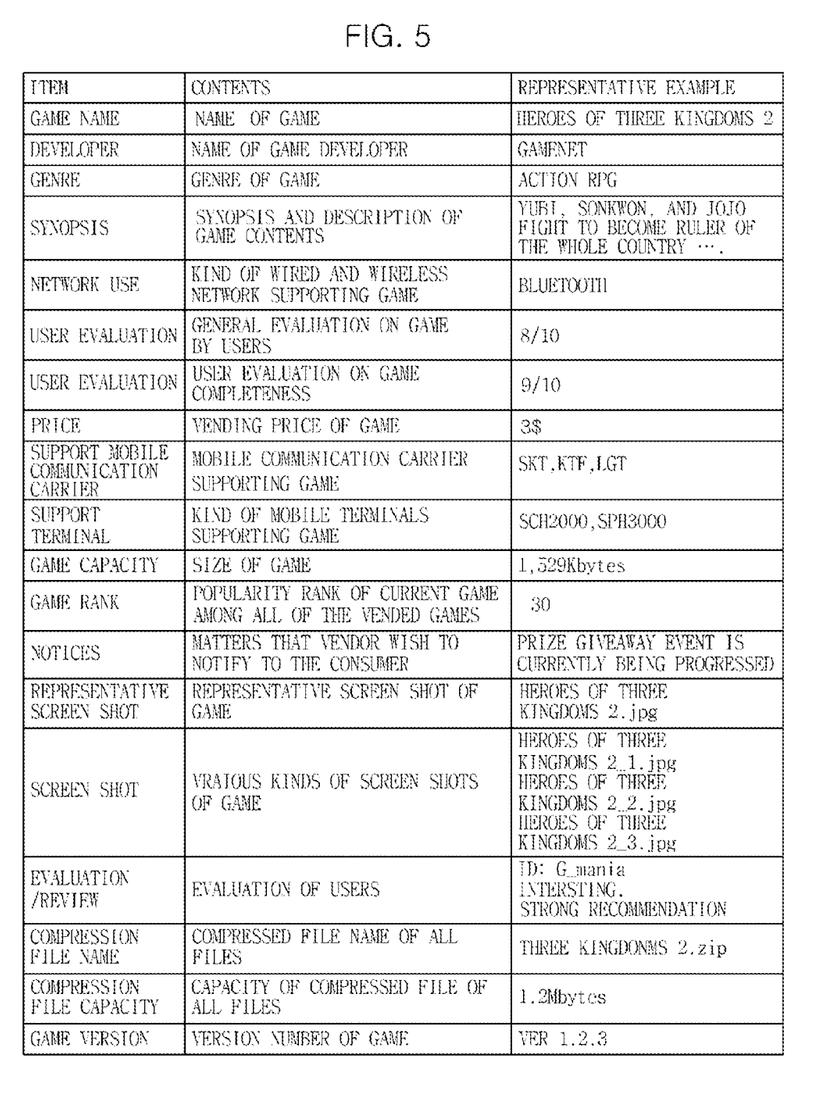
FIG. 5 is a diagram showing one example of information for generating a user interface for vending games.

The game contents managing unit 114 stores the game contents produced by the game provider in the game contents DB 116 and manages the game contents. The game contents stored in the game contents storage unit 396 includes the game executing file (compression image file) compressed to execute games as well as the information (for example, XML descriptor) to generate the user interface for vending games. FIG. 5 shows one example of the information. For example, the information to generate the user interface for vending games may include a game name, a developer, a genre, a synopsis, a use of a network, user's evaluation, game completeness, a price, support, a mobile communication carrier, a support terminal, a game capacity, a game rank, notices, a representative screen shot, a screen shot, an evaluation/review, a compression file name, a compression file capacity, a game version, etc. The contents of the XML descriptor shown in FIG. 5 can be selectively used according to the implementation range when the contents of the XML descriptor are actually implemented. It is apparent that the contents of the XML descriptor can be expanded with the development of technology in future.

Figure 6:
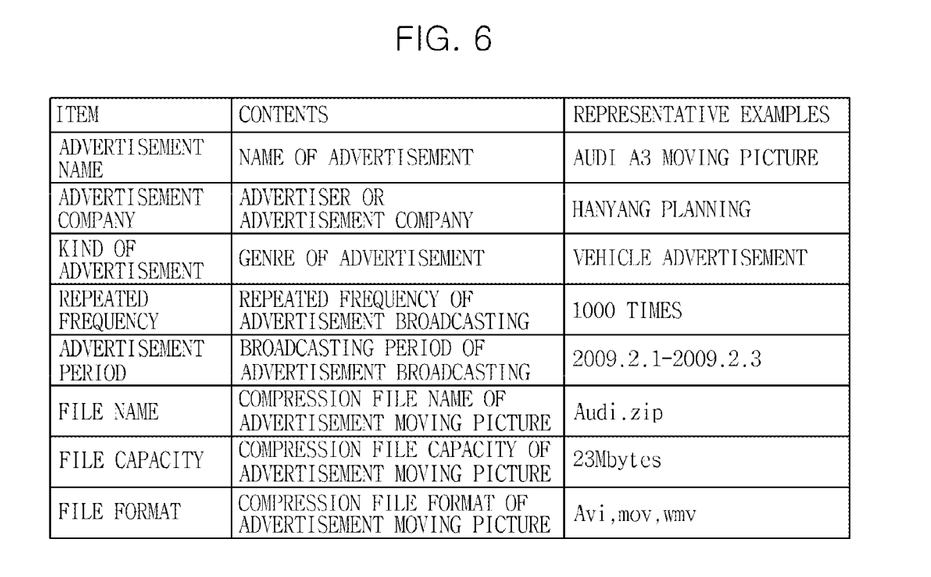
FIG. 6 is a diagram showing one example of information necessary to generate an advertisement screen.

The advertisement contents managing unit 117 stores the advertisement contents for generating the advertisement channel in an idle screen of the game vending machine 310 in the advertisement contents storage unit 119 and manages the advertisement contents. The advertisement contents stored in the advertisement contents storage unit 119 includes the advertisement image file compressed to generate the advertisement screen as well as various information necessary to generate the advertisement screen. Herein, the compressed advertisement image file compresses the image file of the moving picture or the still picture necessary for the actual advertisement, which are decompressed in the game vending machine 310 and used to configure the displayed advertisement screen on the idle screen. In addition, the advertisement contents include various information (for example, XML descriptor) necessary to generate the advertisement screen. FIG. 6 shows an example of the information. The information necessary to generate the advertisement screen in the game vending machine 310 may include an advertisement name, an advertisement producer, an advertisement kind, an advertisement frequency, an advertisement period, a file name, a file capacity, a file format, etc. The interface managing unit 386 of the game vending machine 310 uses the XML descriptor included in the advertisement contents to configure the advertisement channel and generate the advertisement screen.

In FIG. 6 as in FIG. 5, the XML descriptor can be also selectively used according to the implementation range when the XML descriptor is actually implemented. It is apparent that the XML descriptor can be expanded with the development of technology in future.

In the system for vending game contents according to one embodiment according to the present invention, the case where the advertisement contents managing unit 117 and the advertisement contents storage unit 119 are included in the game providing server 110 is shown and described. However, the advertisement contents managing unit 117 and the advertisement contents storage unit 119 are included in the service provider server 200 to be described below to perform the above-mentioned functions. The design thereof can be selectively changed at the time of implementing the system.

Figure 4:
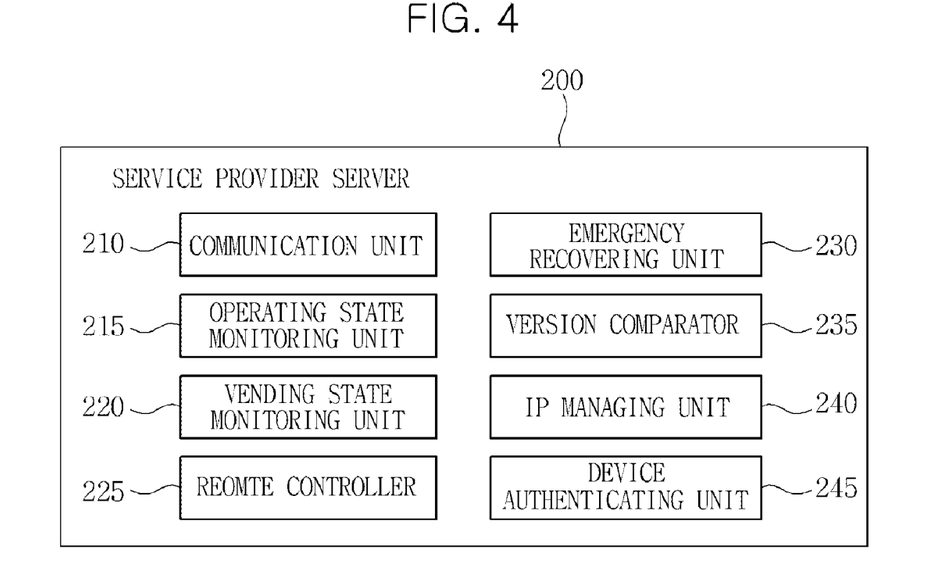
FIG. 4 is a block diagram for explaining in detail a configuration of a service provider server in the system for vending game contents in shown in FIG. 1.

FIG. 4 is a block diagram for explaining in detail a configuration of the service provider server 200 in the system for vending game contents in shown in FIG. 1.

As described with reference to FIG. 1, the service provider server 200 according to the present invention performs a role of receiving the game contents and the advertisement contents from one or more game providing server 110 and then providing the game contents and the advertisement contents to one or more game vending machine 310. In addition, the service provider server 200 manages the history of the game contents that is updated in the game vending machine 310 and the kind and capacity of the game contents, etc., that are currently stored in the game vending machine 310.

Describing in more detail with reference to FIG. 4, the service provider server 200 includes a communication unit 210, an operational state monitoring unit 215, a vending state monitoring unit 220, a remote controller 225, an emergency recovering unit 230, a version comparator 235, an IP managing unit 240, and a device authenticating unit 245.

The communication unit 210 performs a role of receiving the game contents and the advertisement contents transmitted from the game providing server 110 and transmitting them to the game vending machine 310.

The operational state monitoring unit 215 monitors the operational state of the game vending machine 310, which is registered in the service provider server 200. In more detail, the operational state monitoring unit 215 monitors the operational state monitoring, the fault situation, etc., of the registered game vending machine 310. When the registered game vending machine 310 breaks down due to internal factors or the external factor, the operational state monitoring unit reports the history of the fault situation to the central server (not shown) to rapidly recover the corresponding game vending machine 310.

The vending state monitoring unit 220 manages the vending state of game contents that is being vended in the game vending machine 310 registered in the service provider server 200 and when the vending state monitoring unit 220 requests the information on the vending state of the corresponding game contents to the game providing server 110, it provides the information to the game providing server 110.

The remote controller 225 performs functions of remotely booting, rebooting, and terminating the game vending machine 310 that is installed at a remote place.

When the emergency recovering unit 230 senses the fault of the game vending machine 310 through the operational state monitoring unit 215, it performs functions of transmitting and displaying the emergency recovering image to the corresponding game vending machine 310 and recovering and repairing the broken game vending machine 310 at a remote place.

The version comparator 235 can be divided into a package comparing portion and an individual file comparing portion. The game executing file transmitted to the game vending machine 310 is generally changed, such that it may require an expanding pack or some of the plurality of game executing files are modified or updated, such that it may need a patch. In this case, the expanding pack or the patch is provided to the game vending machine 310 by comparing the integrated version through the package comparing portion or the size or the individual version of each file included in the game contents through the comparison portion of the individual files.

The IP managing unit 240 periodically confirms the IP of the registered game vending machine 310 and registers the confirmed IP when the registered game vending machine 310 uses the dynamic IP. When the IP of the game vending machine 310 is changed, the IP managing unit should confirm the changed IP and correct the IP of the registered game vending machine 310 to build the system for vending normal game contents.

The device authenticating unit 245 registers the game vending machine 310 through the predetermined registration process and authenticates the game contents to provide them to the game vending machine 310. The device authenticating unit 245 generates the same or different authenticated encryption for each game vending machine and assigns it to the game vending machine 310 and provides the game contents only to the game vending machine 310 that meets the corresponding authenticated encryption at the time of authentication.

When the game vending machine 310 is not registered in the service provider server 200, the service provider server 200 does not provide the game contents and the service provider server 200 authenticates the game vending machine 310 through the predetermined authentication process and permits the registration of only the game vending machine 310 that is authenticated through the reasonable procedure and provides the game contents.

In the viewpoint of the game provider, they should arouse the user's purchasing desire by providing and posting their own game contents to the game vending machine 310 and should perform essential functions such as the registration, storage, search, deletion, vending, statistical process, etc., of the game contents in the game vending machine 310.

In the viewpoint of the purchaser, that is, the user using the game vending machine 310, purchasing the game contents using the game vending machine according to the present invention should be more convenient than purchasing the game contents using the personal PC or the mobile communication network.

In other words, the game vending machine according to the present invention does not have to perform the complicated progressing procedures, such as Internet search, user registration, user log-in, input of payment information, etc., such that it can more conveniently purchase the game contents than a case of downloading the game contents using a personal computer. In addition, when the mobile communication carrier does not use the wireless data transmitting services, it is expected that the fee amount for a packet for the data transmission through the mobile communication network can be saved.

Meanwhile, when implementing the system for vending game contents, the more core contents provide communication protocol that enables the game provider providing the games in the automatic game vending machine to provide and post his/her own game contents to the game vending machine that exists at a remote place.

With the present invention, the user accesses the game vending machine using his/her own terminal without going through a complicated purchasing procedure such as user registration, log-in, input of the purchasing information, etc., necessary to purchase the game contents using a personal computer connected to the existing Internet, thereby making it possible to conveniently purchase the desired game contents. In other words, the game contents purchasing procedures through the game vending machine according to the present invention provides a very convenient game contents purchasing method for the elderly or those inexperienced at technology.

In addition, the game provider can secure a distribution path, which can freely vend the game contents held or produced by them, without using the communication network of the mobile communication carrier. Therefore, the plurality of game providers secure the market competitiveness equivalent to the mobile communication carrier such that the scale of the game providers becomes large, thereby making it possible to largely contribute to the activation of the game market.

Moreover, when the game contents are purchased by the user using the game vending machine according to the present invention, the service provider collects the plurality of personal providers and vends the game vending machine to them and a profit obtained by vending the game contents stored the game vending machine is distributed to the service provider and the personal provider, thereby making it possible to create a new revenue model. Thereby, a profit distributing structure, which can create a profit in a new type, can be provided to a contents vending machine market.

In addition, even when the user directly purchases the game contents through the game vending machine, he/she does not have to pay additional wireless Internet fee (packet fee) necessarily needed in order to purchase the game contents by using the wireless Internet of the existing mobile communication carrier, such that he/she can save costs of about 70% as compared to the existing costs.

Meanwhile, the game vending machine according to the present invention can be used at places, which can properly use the wireless network infrastructure, such as a high-speed train, a long and mid-range passenger ship, an aircraft, etc., and can create various potential markets, such that the effect and effectiveness thereof become apparent.

Figure 7:
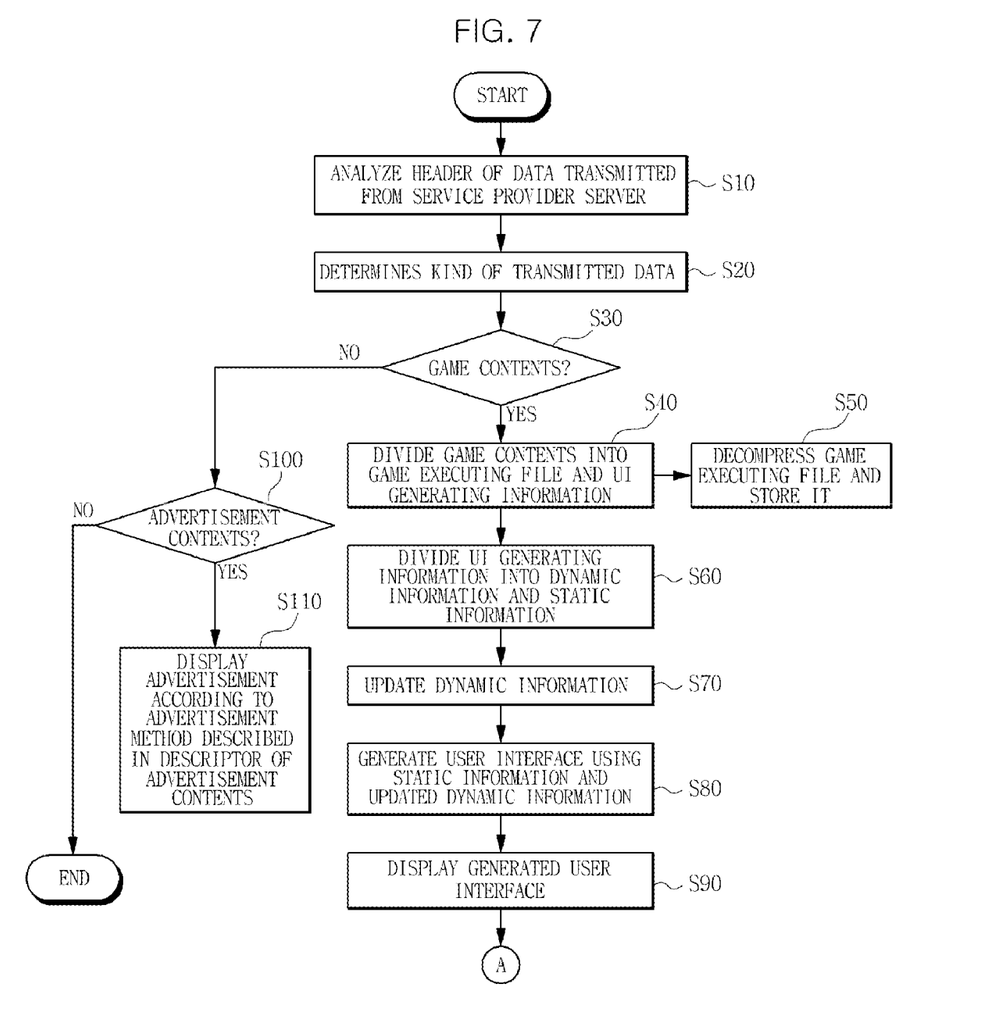
FIGS. 7 and 8 are flow charts for explaining a method for vending game contents in the game vending machine according to the present invention.
Figure 8:
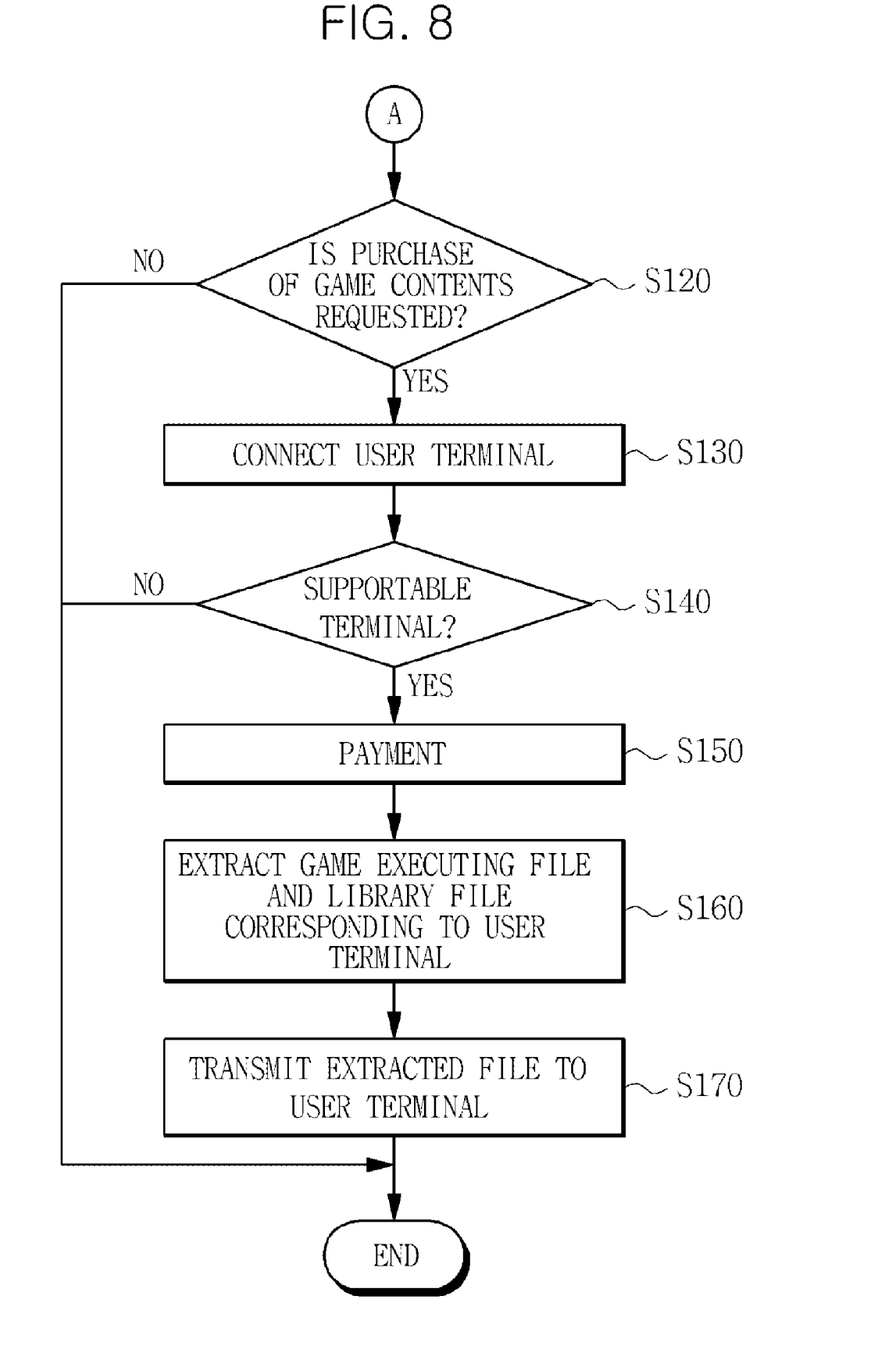

FIGS. 7 and 8 are flow charts for explaining a method for vending game contents in the game vending machines according to the present invention.

Referring to FIGS. 7 and 8, the game vending machine according to the present invention receives data from the service provider server connected through the network and analyzes the header of the received data to grasp the kind of data (S10 and S20).

At step S20, as a result of analyzing the received data from the service server, it determines whether the received data are data corresponding to the game contents (S30).

As a determination result at step S30, when the data received from the service provider server are the game contents, the game contents are divided into the game executing file and the UI generating information (S40). The UI generating information may include the game image information (for example, representative game screen shot), the statistical data on the vended games, the popularity rank of games, the change information on a vending price of games, the event advertisement description for game contents, etc.

The game executing file divided through step S40 is decompressed, which is in turn stored in the contents DB (S50). At this time, it determines whether the transmitted game executing file is previously stored in the contents DB using the search function. As the determination result, in the case of the game contents (that is, game executing file to be newly installed) that is not previously stored, the supporting kind is determined by using the UI generating information of the input game contents to divide each kind to support, perform the decompression, and update the contents DB.

The UI generating information divided through step S40 is divided into dynamic information and static information (S60). The dynamic information means the variable information such as statistical data of vended games, the rank in the popularity of games, the change information on a vending price of games, the event advertisement description for game contents, etc. In other words, the dynamic information is information that can be frequently updated according to the vending situations and vending environments of games, etc. The static information is information when is continuously used at the time of vending if generated once like the game image information (for example, representative game screen shot).

Next, the dynamic information, which is previously stored, is updated using the dynamic information that is divided and extracted through step S60 (S70).

The user interface used at the time of vending games is generated using the static information obtained through step S60 and the dynamic information obtained through step S70 (S80).

According to the foregoing, since the dynamic information such as the statistical data on the vended games, the popularity rank of games, the change information on a vending price of games, and the event advertisement description for game contents can be continuously updated according to the vending situations or the vending environments, etc., thereby making it possible to maximize the effect of the advertisement and purchase for game contents.

As the determination result at step S30, when the data received from the service provider server are the advertisement contents, the advertisement is displayed according to the advertisement method of the advertisement contents that are described in the XML descriptor of the advertisement contents (information necessary to generate the advertisement screen is described) (S110).

Although not shown in the drawings, as the determination result at step S30, when the received data are firmware, they are transmitted to the firmware managing unit in the game vending machine to update the firmware and when the received data is the device driver, they are transmitted to the device driver managing unit in the game vending machine to update the device driver list.

Next, when the user interface for vending games is generated through step S80, it is displayed to the user according to the user input (S90).

The game vending machine determines whether the purchasing request of the game contents is input from the user. When the purchasing request of the contents is input, it makes a request for connecting the user terminal to the game vending machine (S130). When the user terminal is connected to the game vending machine, it determines whether the corresponding user terminal is a supportable terminal (S140). At this time, it can determine whether the corresponding terminal is a supportable terminal using the information obtained through various methods described with reference to FIG. 2. The obtainable terminal information includes the image compression format that is supported by the user terminal, the size of a spare storage space of the user terminal, the screen information of the user terminal, the kind of documents that are supported by the user terminal, the moving picture compression format that is supported by the user terminal, the main memory size of the user terminal, the CPU information of the user terminal, the platform and the library version information mounted on the user terminal, and the kind of libraries that are mounted on the user terminal.

As the determination result at step S140, when the user terminal is a supportable terminal, the payment is performed according to the purchase of the game contents (S150). At this time, the payment can be performed through the already existing various methods such as cash, card, E-money, mobile phone payment, etc.

When the payment completes according to the purchase of the game contents, the game executing file corresponding to the kind of the user terminal is extracted from the contents DB. Further, when executing the game contents using the information of the user terminal obtained through step S140, it determines whether the additional library file is needed. If it is determined that the additional library file is needed, the corresponding library file is selectively extracted (S160).

For example, in the case where there is a need for an additional vector graphic library, window library, etc., in order to execute the game contents selected by the user, a need exists for the game contents as well as a library file necessary to execute the game contents when the corresponding game contents are transmitted from the game vending machine to the user terminal. Thereby, the game vending machine according to the present invention determines whether the user terminal needs the additional library file. If it is determined that the corresponding user terminal needs the additional library file, the game vending machine selectively extracts the additional library file to transmit it together with the game executing file.

When the library file and the game contents executing file to be transmitted to the user terminal are prepared, the prepared game executing file and library file are transmitted to the user terminal using various wired and wireless communication methods (S170). For example, the game executing file and the library file can be transmitted to the user terminal using a wired and wireless interface such as serial communication, universal serial bus (USB), wireless USB, UWB, IEEE1395, WLAN, WIMAX, WIBRO, and Bluetooth interface, etc.

Some steps of the present invention can be implemented as a computer-readable code in a computer-readable recording medium. The computer-readable recording media include all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc., and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the exemplary embodiments have been described and illustrated in the drawings and the description. Herein, specific terms have been used, but are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A game vending machine that receives game contents from a service provider server and vends the game contents, comprising:
    a data analyzer that divides the game contents transmitted from the service provider server into a game executing file and UI generating information and divides the UI generating information into variable dynamic information and continuously usable static information and outputs the divided information;
    a dynamic information updating unit that receives the dynamic information and updates the previously stored dynamic information;
    an interface generator that receives the static information and the updated dynamic information to generate a user interface to be used for vending games; and
    an interface managing unit that displays the generated user interface to a user.

2. The game vending machine according to claim 1, wherein the dynamic information includes at least one information of statistical data on the vended games, a rank in popularity of games, change information on a vending price of games, an event advertisement description for vending games, and user evaluation of games.

3. The game vending machine according to claim 1, wherein the static information includes at least one of a representative screen shot of games, a name of games, a synopsis of games, a genre of games, and a mobile communication carrier for supporting games.

4. The game vending machine according to claim 1, further comprising a library dependency inspector that manages a plurality of library files necessary to execute the game executing file in a user terminal and process the game executing file and the corresponding library file to be transmitted to the user terminal according to the request of the user.

5. The game vending machine according to claim 1, further comprising a server communication managing unit that transmits advertisement contents received from the service provider server to the data analyzer,
    wherein the interface managing unit receives the advertisement contents from the data analyzer and displays the advertisement to the user according to the advertisement method described in a descriptor of the advertisement contents.

6. The game vending machine according to claim 1, further comprising a data output unit that uses any one communication interface of serial communication, a universal serial bus (USB), a wireless USB, UWB, IEEE1395, WLAN, WIMAX, WIBRO, and a Bluetooth interface to transmit the game executing file to the user terminal.

7. The game vending machine according to claim 1, further comprising a contents managing unit that receives the game executing file and updates a contents DB,
    wherein the contents managing unit uses the UI generating information to determine a kind of supportable terminals and divides the game executing file for each supportable terminal to update the contents DB.

8. The game vending machine according to claim 1, further comprising:
    a terminal information grasping unit that grasps the information on a kind of the user terminals to transmit the game executing file; and
    a content image selector that extracts the game executing file corresponding to the kind of the user terminal grasped through the terminal information detector from the contents DB.

9. The game vending machine according to claim 1, further comprising a state managing unit that manages state information on the game vending machine and periodically transmits the state information to the service provider server,
    wherein the state information includes at least one information of a vending state of games, statistical data of vended games, a vending price of games, an operating situation of the game vending machine, an elapsed time after the final vending, and a vending situation of games at each time.

10. A method for vending games that receive game contents from a service provider server and vends the received game contents, comprising:
    analyzing data transmitted from the service provider server and detecting a kind of transmitted data;
    dividing the game contents into a game executing file and UI generating information when the transmitted data is game contents;
    dividing the UI generating information into variable dynamic information and continuously usable static information;
    receiving the dynamic information and updating previously stored dynamic information; and
    receiving the static information and the updated dynamic information to generate an user interface for vending the game contents.

11. The method for vending games according to claim 10, wherein the dynamic information includes at least one information of statistical data on the vending of games, a popularity rank of games, change information on a vending price of games, an event advertisement description for vending games, and user evaluation of games.

12. The method for vending games according to claim 10, wherein the static information includes at least one information of a representative screen shot of games, the name of games, a synopsis of games, the genre of games, and a mobile communication carrier for supporting games.

13. The method for vending games according to claim 10, further comprising transmitting the game executing file and library files necessary to execute the game executing file in a user terminal to the user terminal according to the request of the user.

14. The method for vending games according to claim 10, further comprising periodically transmitting the state information including at least one information of a vending state of games, statistical data of vended game, a vending price of games, an operating situation of the game vending machine, an elapsed time after the final vending, and a vending situation of games at each time to the service provider server.

15. The method for vending games according to claim 10, further comprising determining a kind of supportable terminals by the game executing file using the UI generating information to divide the game executing file for each supportable terminal and update the contents DB.

* * * * *